(12) United States Patent
Rolff et al.

(10) Patent No.: US 8,537,019 B2
(45) Date of Patent: Sep. 17, 2013

(54) SNIFFING LEAK DETECTOR

(75) Inventors: Randolf Rolff, Kerpen-Horrem (DE); Norbert Moser, Huerth (DE); Sandra Seitz, Duesseldorf (DE)

(73) Assignee: Inficon GmbH, Cologne (DE)

( * ) Notice: Subject to any disclaimer, the term of this patent is extended or adjusted under 35 U.S.C. 154(b) by 1231 days.

(21) Appl. No.: 11/920,088

(22) PCT Filed: May 2, 2006

(86) PCT No.: PCT/EP2006/061971
§ 371 (c)(1),
(2), (4) Date: Mar. 5, 2009

(87) PCT Pub. No.: WO2006/120130
PCT Pub. Date: Nov. 16, 2006

(65) Prior Publication Data
US 2009/0212960 A1    Aug. 27, 2009

(30) Foreign Application Priority Data
May 13, 2005  (DE) .......................... 10 2005 022 157

(51) Int. Cl.
*G08B 21/00*     (2006.01)
(52) U.S. Cl.
USPC ............................ 340/605; 73/40.7; 205/784
(58) Field of Classification Search
USPC ................. 340/901, 902, 903, 904, 906, 907; 701/200, 213, 300, 301, 302; 73/1.01, 1.02, 73/1.06, 40, 40.7, 37; 205/785.5, 775
See application file for complete search history.

(56) References Cited

U.S. PATENT DOCUMENTS

| | | | |
|---|---|---|---|
| 3,645,127 A | 2/1972 | Mongodin et al. ............. 73/40.7 |
| 4,269,061 A * | 5/1981 | Hatsuno et al. .................... 73/40 |
| 4,282,470 A * | 8/1981 | Reynolds ...................... 318/648 |
| 4,852,029 A * | 7/1989 | Pope et al. ....................... 702/41 |
| 6,085,576 A * | 7/2000 | Sunshine et al. ............. 73/29.01 |
| 2003/0030001 A1 * | 2/2003 | Cooper et al. ............. 250/338.5 |
| 2003/0079519 A1 | 5/2003 | Wilkinson et al. ............. 73/23.2 |
| 2004/0194533 A1 * | 10/2004 | Bohm et al. ................. 73/23.34 |

OTHER PUBLICATIONS

International Search Report and Written Opinion dated Aug. 4, 2006 based on PCT application No. PCT/EP2006/061971.

* cited by examiner

*Primary Examiner* — George Bugg
*Assistant Examiner* — Edny Labbees
(74) *Attorney, Agent, or Firm* — Ohlandt, Greeley, Ruggiero & Perle, LLP

(57) ABSTRACT

The sniffing leak detector comprises a sniffing probe, a suction device and gas detector. An operator-activated switch initiates the beginning of a measuring operation. The switch starts a time measurement, wherein an alarm signal is generated by a signal transmitter at the end of a predetermined measuring period. The sniffing leak detector allows for an operator guidance from measuring point (MP) to measuring point, wherein the measuring period is predetermined and an adherence to the measuring period is monitored.

9 Claims, 1 Drawing Sheet

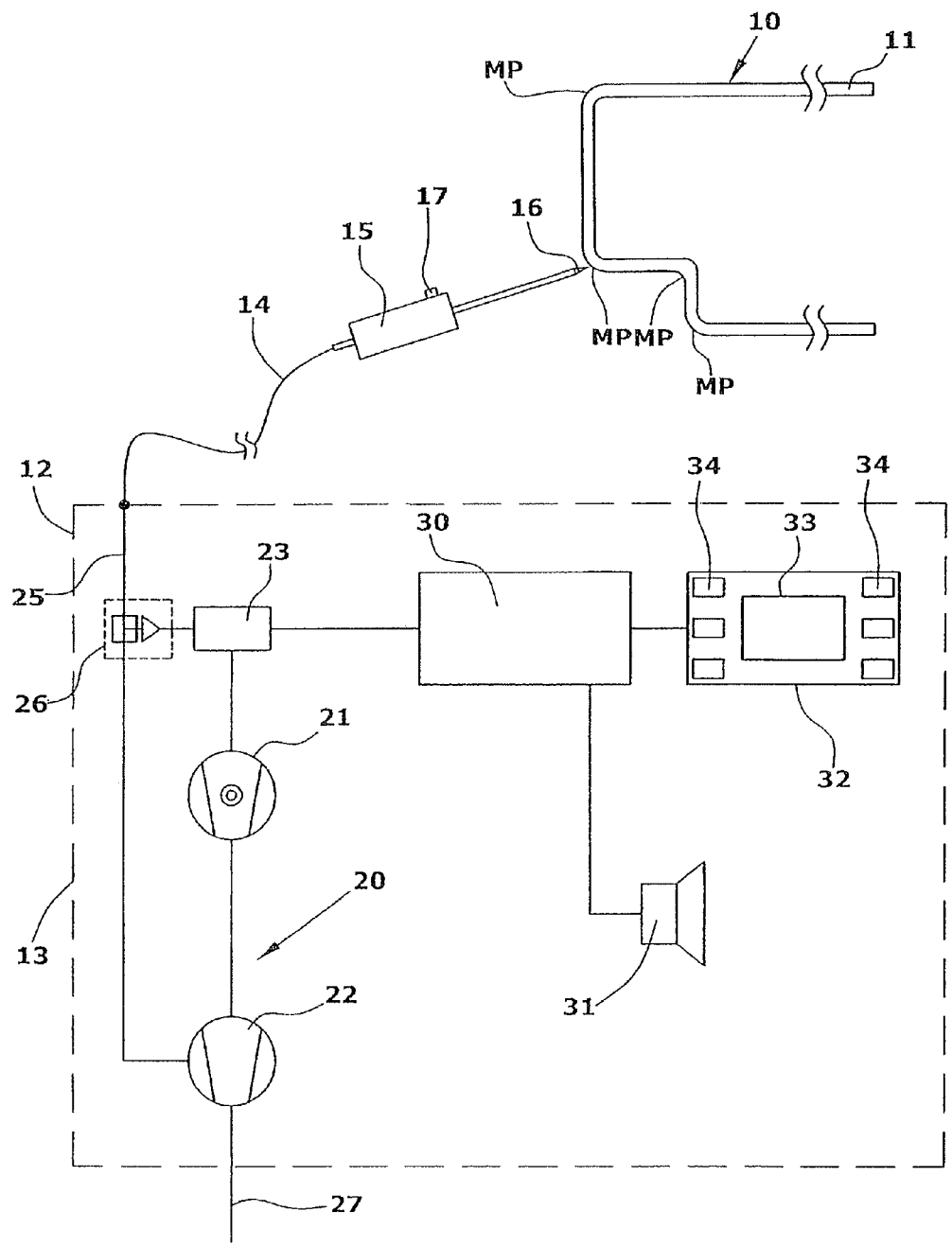

SNIFFING LEAK DETECTOR

BACKGROUND

1. Field of the Disclosure

The disclosure relates to a sniffing leak detector comprising
- an operator-actuated sniffing probe,
- a suction device connected with said sniffing probe, and
- a gas detector connected with said suction device for detecting a test gas.

2. Discussion of the Background Art

Items and systems in which gas pipes are installed frequently require a leak test to be performed. Sniffing leak detectors are known which comprise a handheld sniffing probe connected with a suction device and a gas detector. The test item is filled with a test gas, and test gas escaping through a leak is taken in by the sniffing probe and detected by the gas detector. The sniffing probe is guided along the test item in the vicinity of various critical locations where leaks may exist, and is kept immobile there over a suitable measurement period. The quality and/or the leak tightness of the individual test item can be determined from the leak rate at the measuring point showing the highest leak rate, and/or from the sum of the leak rates of the measuring points. Usually, the operator manually places the sniffing probe at each individual measuring point, thereby ensuring that the measuring probe is kept as immobile as possible, and the measuring time is only estimated. Normally, a trigger value is used as a good/bad message, and an error message is issued when said trigger value is exceeded. During such a course of action, some measuring points may be left out by mistake or inattentiveness, at some measuring points the measurement period may be too short, or the sniffing probe may be moved during the measuring operation. Thus, leaks may be overlooked. On the other hand, an overcautious operator may stay unnecessarily long at a measuring point thus performing the test too slowly. Further, it is not possible to monitor in this manner the sum of all leak rates of the measuring points.

It is an object of the disclosure to provide a sniffing leak detector which facilitates achievement of utilizable measuring results.

SUMMARY OF THE DISCLOSURE

The sniffing leak detector comprises an operator-activated switch which initiates the beginning of the measuring operation when being actuated, and starts a time measurement, wherein an alarm signal is generated at the end of a predetermined measuring period.

The sniffing leak detector indicates the end of a measuring operation, thus leading the operator from one measuring operation to the next one. The operator-activated switch, which may be a switch key at the sniffing probe or a foot switch, initiates the beginning of a measuring operation. The end of the measuring period is automatically indicated by the alarm signal. In this manner, the operator receives a precise indication about the end of the measuring period, said indication ensuring that the measuring period at a measuring point is neither too long nor too short.

Preferably, the switch is connected with a microcomputer which controls an alarm transmitter for generating the alarm signal. The microcomputer may be connected with the gas detector for evaluating the measuring result. In this manner, the measuring result of the measuring point concerned is indicated immediately after termination of a measuring operation.

The microcomputer which evaluates the measuring signal is also capable of counting the number of measuring operations and generating on a display an indication including information on the next measuring operation or the end of the measurement series. For example, the indication may include a request to guide the sniffing probe to the next measuring point. At the last measuring point of a given measurement series where the measuring period ends, the end of the measurement series can be indicated. The microcomputer may further generate a good/bad message of the measurement series. Then the user receives information on whether the result meets the leak tightness requirements.

The microcomputer may perform the control such that it ignores an actuation of the switch during an ongoing measuring operation, or indicates such an actuation as an error. An error message may include an indication telling the operator that the measuring operation is still going on and that the sniffing probe must continue to be kept immobile.

In a preferred aspect of the disclosure, the sniffing probe comprises a movement sensor connected with the microcomputer, which sensor indicates an faulty measuring signal if a movement signal exceeds a threshold value. An acceleration sensor may be used as a movement sensor. The signal of the movement sensor may further serve for invalidating a measuring operation when the sniffing probe has not been kept immobile.

The microcomputer may include different sequence programs for different test items, said sequence programs indicating a measuring period, a limit leak rate and a number of measuring points. In this manner, an operator guidance for each test item is realizable, wherein the respective next steps are displayed on the display of the microcomputer. The measuring results obtained are automatically or semi-automatically evaluated, which allows the workload of the operator to be eased and the test operation to be accelerated.

According to a preferred aspect of the disclosure, the microcomputer generates an indication signal over an ongoing measuring period. Said indication signal may be generated as a continuous tone or an intermittent tone, and tells the operator that the sniffing probe must continue to be kept immobile since the measuring operation is still going on.

On a display all measurement sequence steps to be taken on a test item can be displayed, wherein the respective ongoing measuring operation is highlighted. The operator thus rapidly recognizes which operation in the measuring sequence is currently being performed.

BRIEF DESCRIPTION OF THE DRAWINGS

An embodiment of the disclosure will now be described in greater detail with reference to the only FIGURE of the drawings.

The drawing shows a block diagram of the sniffing leak detector according to the disclosure.

DETAILED DESCRIPTION OF THE PREFERRED EMBODIMENT

The drawing shows a test item 10 which usually is a pipework system 11 or a container. Among the test items to be tested with a sniffing leak detector are, inter alia, refrigerators, cooling units, air conditioners and gas containers. The test item is filled with a detectable test gas, wherein in particular helium or a gas to be sealed in, e.g. a coolant, is a suitable test gas. The test item 10 comprises potential leaks through which the test gas may escape. For determining the leaks, measuring points MP are defined where the sniffing leak detector is positioned for a specific period for the purpose of detecting escaping test gas.

The leak detector 12 comprises a basic device 13 connected with a sniffing probe 15 via a flexible hose line 14. The sniffing probe 15 is a handheld device which may be configured like a pistol and comprises a sniffing tip 16 for taking in gas. Further, a switch 17 is provided at the sniffing probe 15, and an operator holding the sniffing probe in his hand can actuate the switch with this same hand. Actuation of the switch 17 starts a new measuring operation, unless a measuring operation is already going on.

The basic device 13 which is configured as a floor-mounted device or a portable device comprises a suction device 20 composed of a high vacuum pump 21, in particular a turbo-molecular pump, and a pre-vacuum pump 22. The two pumps are connected in series to a gas detector 23 which, in the present embodiment, is a mass spectrometer. Alternatively, other types of gas detectors which respond to a test gas may be used, e.g. an infrared gas analyzer. A conduit 25 connected to the hose line 14 extends via a flow splitter 26 to the gas detector 23 on the one hand and to a suction inlet, the pre-vacuum pump 22, on the other hand. The suction device 20 generates a vacuum required for proper functioning of the gas detector 23, and also the suction power for operating the sniffing probe 15. An outlet 27 of the pre-vacuum pump 22 extends into the atmosphere.

The mass spectrometer supplies a measuring signal to a microcomputer 30 which controls a signal transmitter 31 and a display 32. The signal transmitter 31 is an acoustical signal transmitter. Alternatively, optical or vibrating devices can be used. The display 32 comprises a screen 33 and various operating and input keys.

The sniffing probe 15 takes in gas at a measuring point MP where test gas may escape. This gas is air possibly mixed with test gas. The leak detector checks the gas mixture for the presence of test gas.

With the aid of the microcomputer 30, a program running on said microcomputer, the switch 17 and the signal transmitter 31 an operator guidance including the following steps is performed:

1. The operator moves the sniffing tip 16 to the next measuring point MP at the test item 10, and confirms via switch 17 the stable immobile position of the sniffing tip at the proper measuring point.
2. Actuation of the switch 17 initiates the beginning of a measuring operation. The microcomputer 30 starts a time measurement, wherein an alarm is generated by the signal transmitter 31 at the end of a predetermined measuring period.
3. The microcomputer 30 evaluates the measuring signal of the gas detector 23, increments the number of the measuring point MP by "1", and requests the operator via the signal generator 31 and/or via the display 32 to move the sniffing tip 16 to the next measuring point MP. When the last measuring point has been reached, the end of the measuring series is indicated.
4. When the end of the measuring series has been reached, the microcomputer transmits to the operator a good/bad message concerning the measured leak rates via the signal transmitter 31 and/or the display 32.
5. Subsequently, the next measuring series is started automatically or after acknowledgement by the operator by actuating the switch 17.

The following configurations of the sniffing leak detector are feasible:

The microcomputer 30 may monitor the time the tester needs in step 1 for guiding the sniffing tip from one measuring point to the next one. An earlier actuation (before an adjustable minimum time) of the switch 17 is then either not accepted or indicated as an error. Thus the tester is prevented from working too hectically and inaccurately.

During the measuring period in step 2 a movement sensor arranged in the sniffing probe 15 may check whether the operator keeps the tip immobile to a proper extent. If the tip is too strongly moved, the microcomputer may indicate an error and request a repetition of the measuring operation.

For different test items 10 different programs may be stored in the microcomputer 30, wherein a suitable program for the respective system to be measured can be activated. The programs include, for example, but not exclusively, a measuring time, a minimum time, a limit leak rate, and a number of measuring points. The operator is offered a proper operator guidance for each test item.

For informing the operator about the measuring time, the microcomputer can issue a continuous signal and/or an intermittent continuous signal via the signal transmitter 31 during the measuring period for telling the operator that the handheld sniffing probe must continue to be kept immobile. It is further reasonable to represent the operator guidance on a display arranged at the sniffing probe. This allows the operator to direct his attention mainly to the sniffing probe.

What is claimed is:

1. A sniffing leak detector comprising:
   an operator-actuated sniffing probe,
   a suction device connected with said sniffing probe, and
   a gas detector connected with said suction device for detecting a test gas,
   wherein an operator-activated switch is provided which initiates the beginning of a measuring period when being activated, and starts a time measurement, wherein an alarm signal is generated at the end of a predetermined measuring period,
   wherein said switch is connected with a microcomputer which controls a signal transmitter for generating an alarm signal, and
   wherein said microcomputer ignores or indicates as an error an actuation of the switch during an ongoing measuring operation.

2. The sniffing leak detector according to claim 1, wherein said microcomputer is connected with the gas detector for evaluating the measuring result.

3. The sniffing leak detector according to claim 1, wherein said microcomputer monitors the period between the beginnings of two measuring periods, and does not accept or indicates as an error a premature beginning of the second measuring period initiated by actuation of the switch.

4. The sniffing leak detector according to claim 1, wherein said microcomputer counts the number of measuring operations, and generates on a display an indication including information on the next measuring operation or the end of a measuring sequence.

5. The sniffing leak detector according to claim 1, wherein said microcomputer generates a good/bad message of the measuring sequence on the basis of the measuring results.

6. The sniffing leak detector according to claim 1, wherein said sniffing probe comprises a movement sensor connected with the microcomputer which indicates a faulty measuring signal when a movement signal exceeds a threshold value.

7. The sniffing leak detector according to claim 1, wherein said microcomputer includes different sequence programs for different test items, said sequence programs each indicating a measuring time, a limit leak rate and a number of measuring points.

8. The sniffing leak detector according to claim 1, wherein said microcomputer generates an indication signal over an ongoing measuring period.

9. The sniffing leak detector according to claim 1, wherein all steps of a measuring sequence to be performed on a test item are displayed on a display, wherein the respective ongoing measuring operation is highlighted.

\* \* \* \* \*